United States Patent Office 2,960,435
Patented Nov. 15, 1960

2,960,435
SYNTHESIS OF STEROIDS BY
ASPERGILLUS GIGANTEUS

Milton N. Donin, Metuchen, Josef Fried, New Brunswick, and Richard W. Thoma, Somerville, N.J., assignors to Olin Mathieson Chemical Corporation, New York, N.Y., a corporation of Virginia No Drawing. Original application Dec. 5, 1956, Ser. No. 626,318. Divided and this application Oct. 24, 1958, Ser. No. 777,530

1 Claim. (Cl. 195—51)

This application is a division of our parent application, Serial No. 626,318, filed December 5, 1956, and now U.S. Patent No. 2,881,189.

This invention relates to, and has for its object the provision of, the new steroids, 11α,15β-dihydroxyprogesterone (Δ⁴-pregnene-11α,15β-diol-3,20-dione), the diesters thereof and 11,15-diketoprogesterone (Δ⁴-pregnene-3,11,15,20-tetraone). The compound 11α,15β-dihydroxyprogesterone is prepared by subjecting progesterone to the action of enzymes of the microorganism *Aspergillus giganteus* under aerobic conditions. The hydroxylation can best be effected by either including the steroid in an aerobic culture of the microorganism, or by bringing together in an aqueous medium the steroid, air and enzymes of non-proliferating cells of the microorganisms.

In general, the conditions of culturing *Aspergillus giganteus* for the purposes of this invention are (except for the inclusion of the steroid to be converted) the same as those of culturing various other aerobic fungi for the production of antibiotics, organic acids, or vitamins, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose, starch or dextrin), a higher fatty acid, a fat and/or the steroid itself. Preferably, however, the medium includes an assimilable source of carbon and energy in addition to the steroid. The sources of nitrogenous factors may be organic (e.g., soybean meal, corn steep liquor, meat extract and/or distillers solubles) or synthetic (e.g., composed of simple, synthesizable organic and inorganic compounds, such as ammonium salts, alkali nitrates, amino acids or urea).

An adequate sterile-air supply should be maintained during fermentation, for example, by the conventional methods of exposing a large surface of the medium to air or by utilizing submerged aerated cultures. The steroid may be added to the culture during the incubation period or included in the medium prior to sterilization or inoculation.

The process yields 11α,15β-dihydroxyprogesterone, which in turn can either be esterified in the usual manner, as by treatment with an acyl halide or acid anhydride to yield the diester derivative, or oxidized as by treatment with a hexavalent chromic compound (e.g., chromic acid) to yield 11,15-diketoprogesterone. Although any acylating agent may be used to form the diester, the preferred compounds are the acyl chlorides or acid anhydrides of hydrocarbon carboxylic acids having less than ten carbon atoms, as exemplified by the lower alkanoic acid anhydrides (e.g., acetic anhydride), monocyclic aryl carbonyl chlorides (e.g., benzoyl chloride), monocyclic aralkanoic acid chlorides (e.g., phenacetyl chloride), the lower alkenoic acid anhydrides and the monocycloalkanecarbonyl halides.

The steroids thus formed are of the general formula

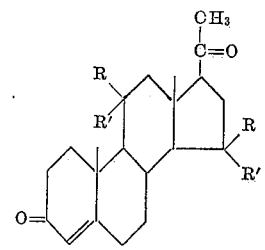

wherein R is hydrogen, R' is hydroxy or acyloxy (particularly the acyloxy radical of a hydrocarbon carboxylic acid having less than ten carbon atoms) or together R and R' is keto.

11,15-diketoprogesterone and the diesters of 11α,15β-dihydroxyprogesterone are physiologically active steroids which possess progestational activity and, hence, can be used in lieu of known progestational steroids such as progesterone in the treatment of functional uterine bleeding, being formulated for such administration in the same type of preperations as progesterone, for example, with concentration and/or dosage based on the activity of the steroid.

The following examples illustrate the invention (all temperatures being in centigrade):

EXAMPLE 1

*11,15β-dihydroxyprogesterone*

(a) *Fermentation.*—The surface growth from a two-week-old Sabouraud-dextrose agar slant of *Aspergillus giganteus* ATCC 10059 (American Type Culture Collection, Washington, D.C.) is transferred to 6 flasks, 500-ml. Erlenmeyer type, each with 100 ml. of medium composed of 36 g. corn steep liquor, 10 g. brown sugar, 6 g. NaNO₃, 1.5 g. KH₂PO₄, 0.5 g. MgSO₄.7H₂O, 1 mg. ZnSO₄, 5 g. CaCO₃, 2 g. lard oil and distilled water to 1 liter, sterilized by autoclaving at 120° C. for 40 min. The inoculated flasks are incubated at 25° C. and rotated mechanically during incubation at 280 r.p.m. in a 2-inch radius. After 48 hours, a 10% transfer is made to 30 similar flasks containing 100-ml. portions of medium composed of 6 g. corn steep liquor, 3 g. NH₄H₂PO₄, 2.5 g. CaCO₃, 2.2 g. soybean oil, 0.25 g. progesterone and distilled water to 1 liter, sterilized by autoclaving at 120° C. for 30 min. Incubation of cultures with steroid is for 68 hours. The contents of the flasks are pooled and filtered through a Seitz clarifying pad. Flasks and pad are washed with water. The volume of filtrate and washings, representing 750 mg. of original steroid, is 2750 ml.

(b) *Isolation.*—The culture filtrate is extracted with four 500-ml. portions of chloroform and the combined extracts evaporated to dryness in vacuo. The semicrystalline residue is dissolved in 3 ml. chloroform and 3 ml. benzene and chromatographed on 20 g. of sulfuric acid-washed alumina. Chloroform-benzene 1:1 (100 ml.) elutes about 23 mg. of amorphous material. This is followed by about 495 mg. of crystalline material eluted with chloroform (250 ml.). Recrystallization of this material from acetone gives pure 11α,15β-dihydroxyprogesterone of the following properties: M.P. about 173–175°; [α]$_D^{23}$+134° (c, 0.70 in CHCl₃);

λ$_{max.}^{alc.}$ 242 mμ (ε=16,100); λ$_{max.}^{Nujol}$ 3.03, 5.89, 6.06μ

*Analysis.*—Calcd. for C₂₁H₃₀O₄ (346.45): C, 72.80; H, 8.73. Found: C, 72.88; H, 8.58.

EXAMPLE 2

11α,15β-dihydroxyprogesterone diacetate

A solution of 25 mg. of 11α,15β-dihydroxyprogesterone in 1 ml. of anhydrous pyridine and 1 ml. of acetic anhydride is allowed to remain at room temperature for 40 hours. After removal of the reagents by evaporation in vacuo, there remains a residue consisting of 11α,15β-dihydroxyprogesterone diacetate.

EXAMPLE 3

11,15-diketoprogesterone 53 mg. of 11α,15β-dihydroxyprogesterone is dissolved in 3 ml. of glacial acetic acid and oxidized with a solution of 65 mg. of chromic acid in 6.5 ml. of acetic acid. After 30 minutes 0.5 ml. of methanol is added and the mixture concentrated to small volume. The mixture is taken up in chloroform and water and the chloroform solution extracted with water, dilute bicarbonate and again with water. The chloroform extract is dried over sodium sulfate and the solvent removed in vacuo. The residue (about 34.3 mg.) is recrystallized from acetone-ether and affords pure 11,15-diketoprogesterone of the following properties: M.P. about 196–199°; $[\alpha]_D^{23}+276°$ (c, 0.80 in $CHCl_3$);

$\lambda_{max.}^{alc.}$ 238 m$\mu$ ($\epsilon=15,200$); $\lambda_{max.}^{Nujol}$ 5.76, 580, 5.98, 6.05, 6.16$\mu$.

*Analysis.*—Calcd. for $C_{21}H_{26}O_4$ (342.42): C, 73.66; H, 7.65. Found: C, 74.10; H, 7.82.

The invention may be otherwise variously embodied within the scope of the appended claim.

We claim:

A method for producing 11α,15β-dihydroxyprogesterone which comprises subjecting progesterone to the action of an enzyme of *Aspergillus giganteus* in an aqueous medium in the presence of oxygen, and recovering the 11α,15β-dihydroxyprogesterone steroid formed.

References Cited in the file of this patent

UNITED STATES PATENTS

| | | |
|---|---|---|
| 2,649,402 | Murray | Aug. 18, 1953 |
| 2,753,290 | Fried et al. | July 3, 1956 |
| 2,823,170 | Muir et al. | Feb. 11, 1958 |
| 2,844,513 | Wettstein et al. | July 22, 1958 |

OTHER REFERENCES

Meister et al.: J.A.C.S., 76, Aug. 5, 1954, pages 4050–4051.

Meister et al.: Helvetica Chemica Acta, March 15, 1955, 381 to 393.

Fried et al.: Recent Progress in Hormone Research, 11 (1955), pages 157–158.

UNITED STATES PATENT OFFICE
CERTIFICATION OF CORRECTION

Patent No. 2,960,435

November 15, 1960

Milton N. Donin et al.

It is hereby certified that error appears in the above numbered patent requiring correction and that the said Letters Patent should read as corrected below.

Column 2, lines 3 to 12, the formula should appear as shown below instead of as in the patent:

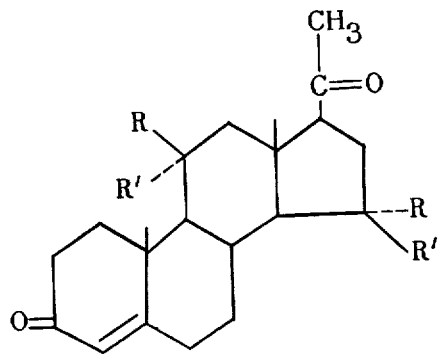

same column 2, line 33, for "11,15β-" read -- 11α,15β- --.

Signed and sealed this 18th day of July 1961.

(SEAL)
Attest:

ERNEST W. SWIDER
Attesting Officer

DAVID L. LADD
Commissioner of Patents